Sept. 9, 1924.                                                    1,507,563
                      A. O. ABBOTT, JR
        METHOD AND APPARATUS FOR MANUFACTURING TIRE CASINGS
                   Filed Aug. 8, 1923         7 Sheets-Sheet 1

INVENTOR.
ADRIAN O. ABBOTT, JR.
BY
HIS ATTORNEY.

Sept. 9, 1924.  
A. O. ABBOTT, JR  
1,507,563  
METHOD AND APPARATUS FOR MANUFACTURING TIRE CASINGS  
Filed Aug. 8, 1923   7 Sheets-Sheet 2

INVENTOR  
ADRIAN O. ABBOTT, JR.  
BY  
HIS ATTORNEY.

INVENTOR.
ADRIAN O. ABBOTT, JR.
BY Ernest Hopkinson
HIS ATTORNEY.

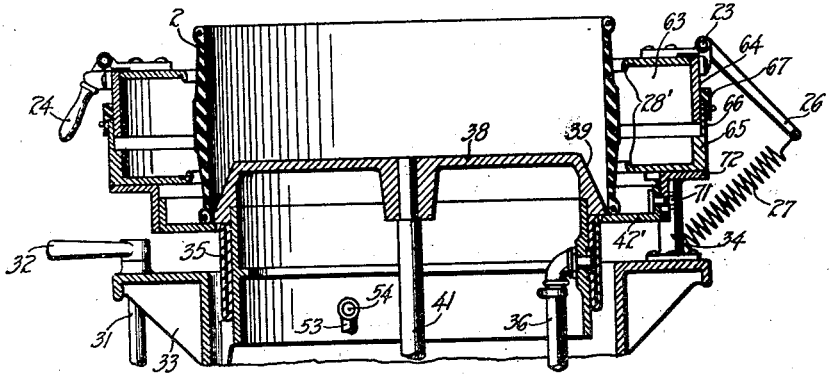

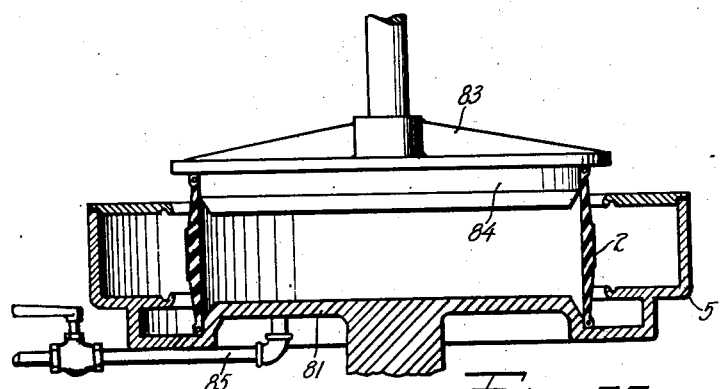
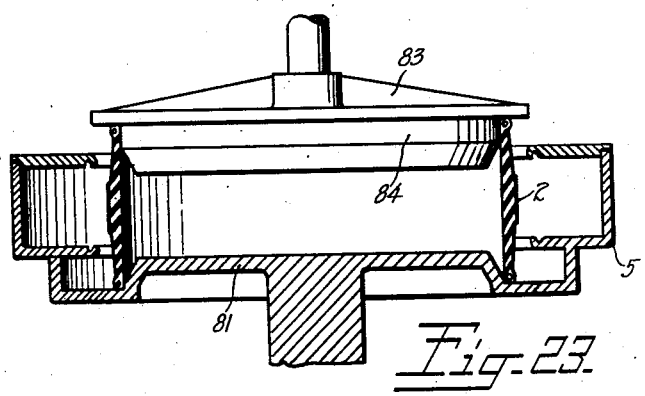
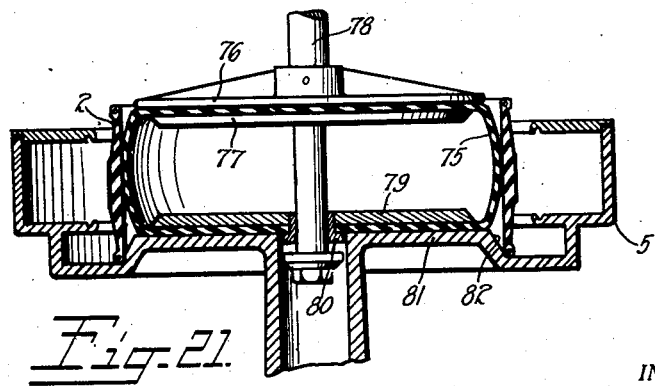

Sept. 9, 1924.  
A. O. ABBOTT, JR  
1,507,563  
METHOD AND APPARATUS FOR MANUFACTURING TIRE CASINGS  
Filed Aug. 8, 1923  
7 Sheets-Sheet 6

INVENTOR.  
ADRIAN O. ABBOTT, JR.  
BY  
HIS ATTORNEY.

Patented Sept. 9, 1924.

1,507,563

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

METHOD AND APPARATUS FOR MANUFACTURING TIRE CASINGS.

Application filed August 8, 1923. Serial No. 656,382.

*To all whom it may concern:*

Be it known that I, ADRIAN O. ABBOTT, Jr., a citizen of the United States, residing at Detroit, county of Wayne, and State of Michigan, have invented a certain new and useful Method and Apparatus for Manufacturing Tire Casings, of which the following is a full, clear, and exact description.

This invention is concerned with the shaping and vulcanization of tire casings for motor vehicles which have been built on a "drum" (flat or crowned) as distinguished from a "core." It aims generally to provide an economical method of manufacture, and one that may be performed with simple and inexpensive apparatus. More particularly, it endeavors to provide a method of manufacture that may be carried on rapidly, that requires very little handling or manipulation, that minimizes the number of operatives required to practice the method, and that is simple and practical of execution in a factory. The apparatus is simple and without complicated parts liable to get out of order and in consequence co-ordinate inexactly. The apparatus is inexpensive and lends itself to rapid manipulation, not requiring the operatives to wait upon it, consequently, the rate of production is primarily dependent upon the speed of the operatives and they have but plain, easy operations to perform. The above are some of the advantages of the invention, others will appear in the subsequent detail description.

With the preferred of the illustrated embodiments of the discovery in mind, but without intention to limit its scope more than is required by the prior art, the invention, briefly, consists in making a pulley-band of strain-resisting-elements and rubber composition of a size preferably smaller than the internal diameter of a fixed vacuum chamber, preliminarily puffing or bulging the band as with an inflating tube so as to close the inner open side of the vacuum chamber, reducing the pressure on the exterior of the pulley-band by exhausting the vacuum chamber and thereby completely shaping the pulley-band to tire form, introducing in the cavity of the shaped casing a hollow bag whose rubber composition walls are designed to sustain the casing in tire shape, mounting the casing on bead rings, introducing the assembled bag, casing and bead rings in a mold, and finally vulcanizing the casing. The pulley-band may be made or built so as to contact with the vacuum chamber without an initial distension or bulging and, in this event, some of the operations enumerated may be omitted. The initial distension of the pulley-band, when resorted to, may be performed variously.

Various embodiments of the invention are illustrated in the accompanying drawings in which:—

Figure 12 is a sectional elevation similar to Figure 6, but showing an adjustable form of vacuum chamber, and also showing a straight-side or inexpansibly beaded casing in contra-distinction to a clinched type casing illustrated in the previously mentioned figures;

Figure 13 is a fragmentary section of the apparatus of Figure 12, showing the different positions of the casing;

Figures 14 and 15 are fragmentary elevations and sections, respectively, of the adjustable vacuum chamber appearing in Figure 12, showing the means for adjusting the top and bottom walls of the vacuum chamber to accommodate pulley-bands of different widths;

Figure 16 is a cross-section illustrating an undesirable proportion of the vacuum chamber relative to a straight-side casing;

Figures 17 and 18 are fragmentary elevations and section, respectively, showing a preferred configuration of the inner faces of the top and bottom walls of the vacuum chamber;

Figure 6:
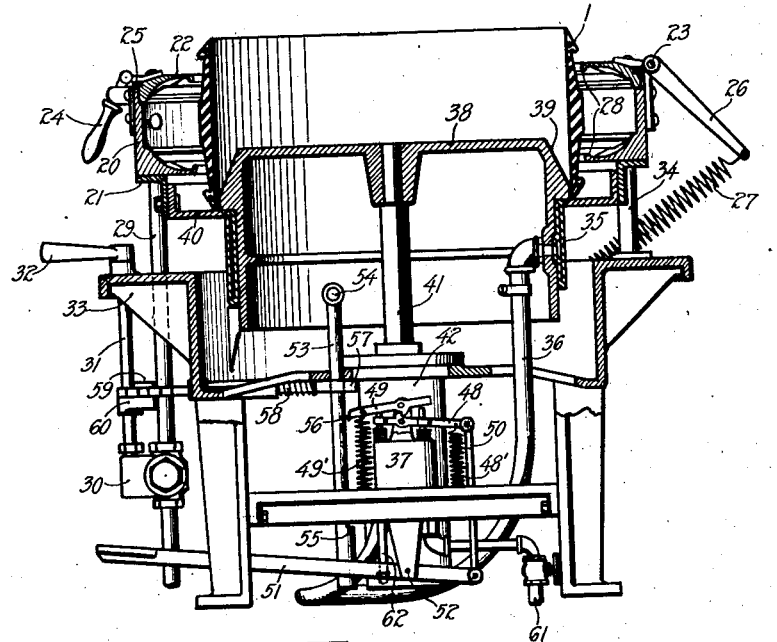
Figure 6 is a sectional elevation of the preferred apparatus with a casing in cross-section appearing in its initially mounted position.
Figure 24:
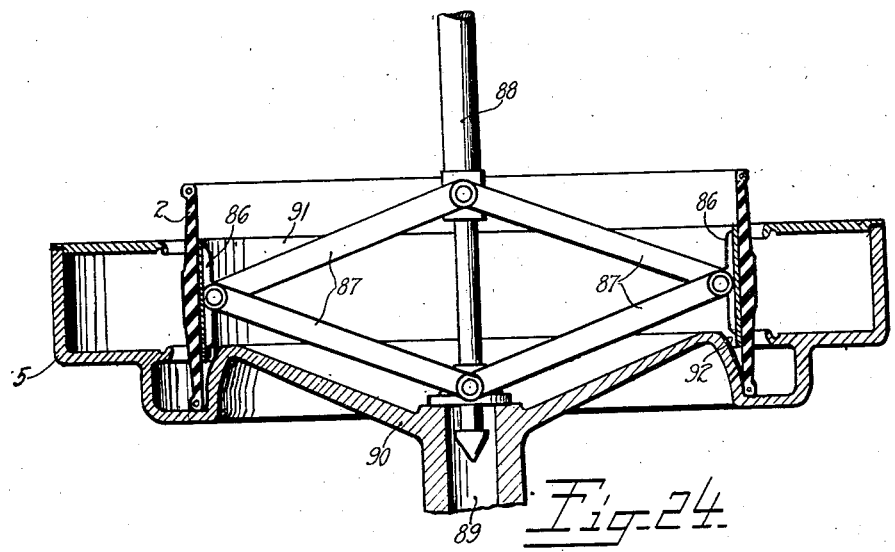
Figure 19:
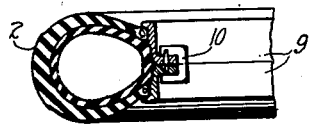
Figure 20:
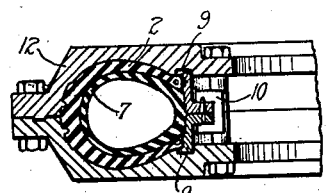
Figure 25:
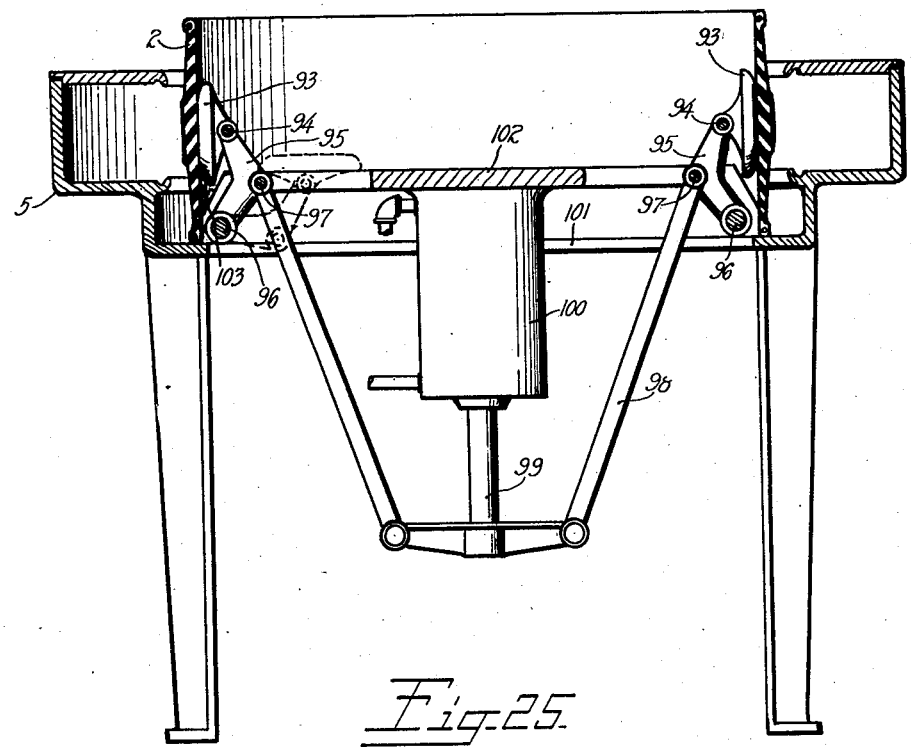
Figure 26:
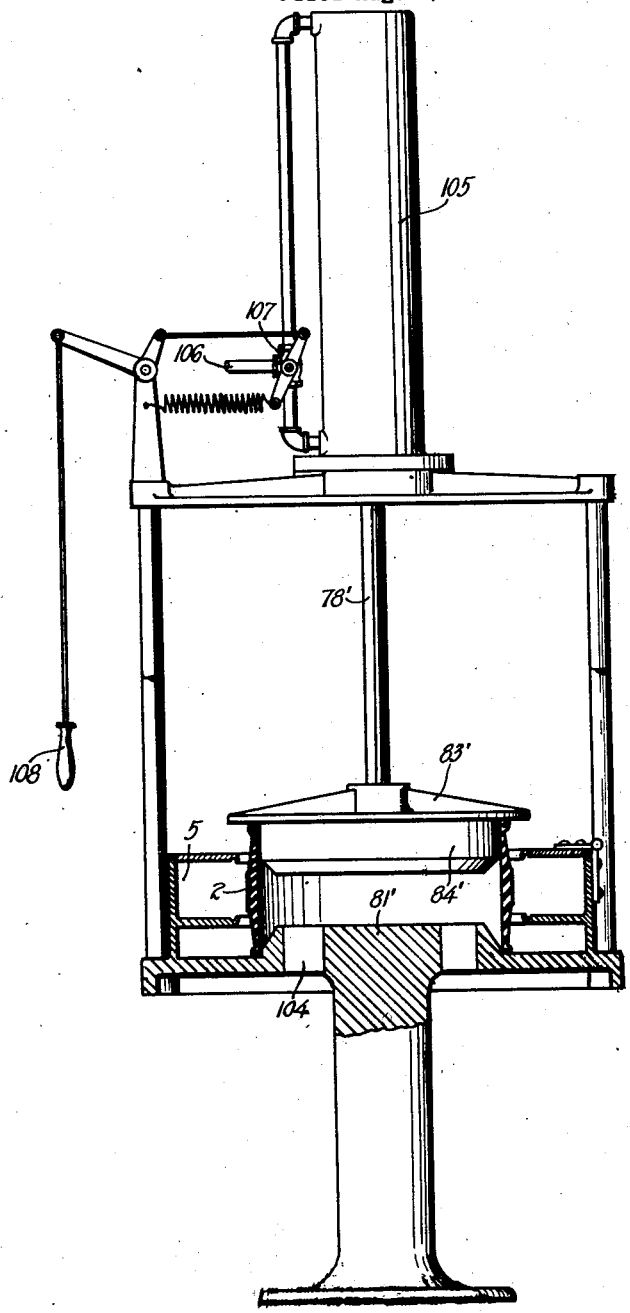

Figures 6ª, 6ᵇ and 6ᶜ are details of the apparatus shown in Figure 6;

Figure 19 is a cross-section of the straight-side casing mounted on bead rings;

Figure 20 is a cross-section of the same assembled in a vulcanizing mold;

Figure 21 is a cross-section of a modified form of inflating tube for initially distending the casing to a position operative upon by the vacuum chamber;

Figures 22 and 23 illustrate modified forms of the apparatus, in which the pulley band is initially distended by air in direct contact with its inner surface to a position operative upon by the vacuum chamber;

Figures 24 and 25 are sectional elevations, respectively, of mechanical means for initially bulging a casing into contact with the vacuum chamber; and Figure 26 is a sectional elevation of another form of apparatus for initially distending or bulging a pulley-band into contact with the vacuum chamber, in this apparatus the casing being progressively rolled or folded outwardly.

Figure 1:
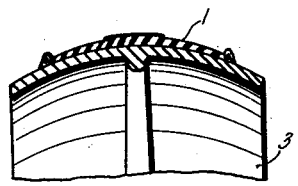
Figure 1 is a cross-section of a casing and crowned building drum.
Figure 2:
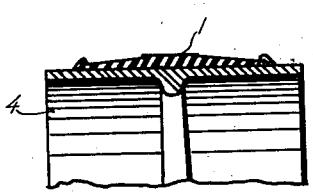
Figure 2 is a cross-section of a casing and flat building drum.
Figure 3:
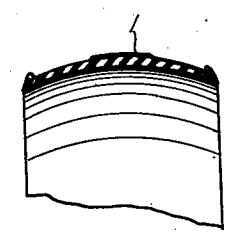
Figure 3 is a cross-section of a casing alone as it appears after being built on a flat drum at a diameter greater than the bead diameter of the finished casing.

The casing is first built in the form of a sleeve or hollow cylinder which may be flat or arched in cross-section and which is comprehensively designated "a pulley-band." Clincher type pulley-bands are indicated by the numeral 1 and straight-side type or inextensibly beaded pulley-bands by the numeral 2. These pulley-bands may be built of rubberized cord, or woven fabric in plies or layers and vulcanizable rubber composition, in any convenient manner, such as that disclosed in patent to Ernest Hopkinson No. 1,374,505, granted April 12th, 1921. They may be built on collapsible crowned drums, such as indicated at 3 in Figure 1, or collapsible flat drums, such as indicated at 4 in Figure 2. The diameter of the building drums when the constituents of a casing are assembled thereabout is preferably approximately equal to the bead diameter of the finished casing, but not necessarily as the drum may be of a greater diameter. In the latter case, a clincher casing, for instance, may be built flat and then, when the drum is collapsed, brought to the curved form illustrated in Figure 3, by reason of the tension in the margins of the pulley-band, resulting from the incorporation of the partially vulcanized beads in a stretched condition, as more fully disclosed in a pending application of William J. Steinle, Serial No. 562,965, filed May 23rd, 1922. For manufacturing clincher casings with plies of woven fabric, a crowned building drum, is particularly advantageous.

Figure 4:
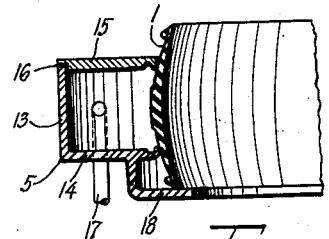
Figure 4 is a cross-section of a casing, such as illustrated in Figure 3, mounted or seated so as to substantially close the inner open side of a simple form of vacuum chamber.
Figure 5:
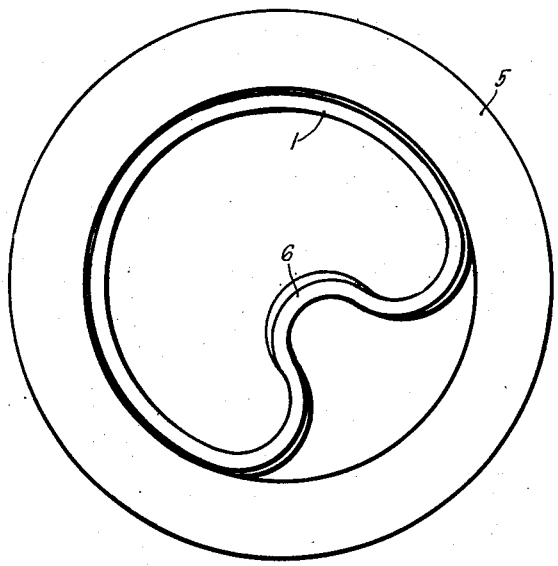
Figure 5 is a plan view, showing how a casing, such as illustrated in Figure 3, may be folded for mounting in a vacuum chamber, such as shown in Figure 4.
Figure 7:
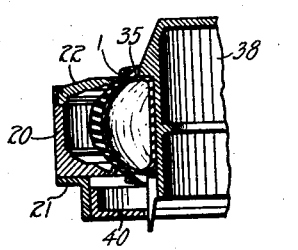
Figure 7 is a fragmentary cross-section showing a casing after it has been initially distended with an inflating tube and partly shaped.
Figure 8:
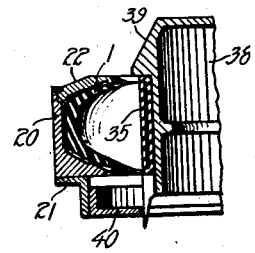
Figure 8 is a fragmentary section showing the casing fully expanded and held in position in the vacuum chamber.

However the pulley-band is fabricated or assembled, it is then positioned in contact with an evacuating apparatus such as that shown in cross-section at 5 in Figure 4, for pulling or vacuously shaping it to approximately tire form. If it has been built to the shape diagrammatically illustrated in cross-section in Figure 3 as it may be either on a crowned drum or on a flat drum as before mentioned the pulley-band may be buckled as indicated at 6 in Figure 5, and then restored to shape so as to contact with the open inner periphery of the vacuum chamber 5. If, however, the pulley-band has been built flat and at approximately the bead diameter of the finished casing, it is inserted loosely in symmetrical relation with an evacuating apparatus, as shown for instance in Figure 6 of the drawings, and then initially distended or bulged as in Figure 7 for instance so as to substantially close off the inner open side of the vacuum chamber. So positioned it may be completely shaped to approximately tire form also by exhausting air from the vacuum chamber, as shown in Figure 8 of the drawings, for instance.

The initial bulging or distension of the pulley-band, when required, may be accomplished in a variety of ways and many expedients are illustrated in the various figures of the drawings. These various expedients include initial bulging or distension (a) with an inflating tube of one form or another, as shown in Figures 6, 7, 8, 12 and 21, (b) with air or gas in direct contact with the inner surface of the pulley-band, as illustrated in Figures 22 and 23, and (c) with purely mechanical means or instrumentalities such as are illustrated in Figures 24, 25 and 26.

As before indicated, the pulley-band casing, after being mounted in contact with a vacuum chamber, is shaped to approximately tire form by exhausting air from the chamber, thereby differentially pressing upon its opposite faces, preferably with air at atmospheric pressure free to exert its force against the inner surface of the pulley-band.

Figure 9:
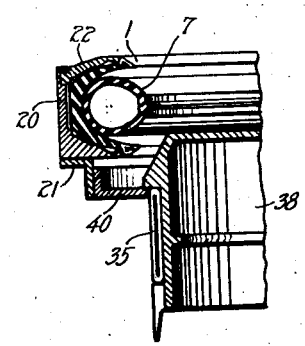
Figure 9 is a similar view showing an annular fluid container in sustaining position within the shaped casing, the inflating tube and its support appearing contracted to a position facilitating the introduction of the container.

After removal of the instrumentalities for initially distending the pulley-band to a non-obstructing position, an empty fluid-pressure-container, such as that indicated at 7 in Figure 9, is then introduced in the casing which is held in shape and with its margins open so as to easily take or receive the container. The latter may be of any suitable and convenient construction, but is preferably made of rubber composition capable of repeated heat treatments and of a wall thickness sufficient to sustain or maintain the casing in approximately tire form for a while at least. Preferably the bags are inflated after being positioned also to assist in maintaining the casing in shape especially when a long time elapses between shaping and vulcanization. It is to be understood, however, that the fluid pressure container 7 may be constructed in any manner desired that will permit it to be introduced within a shaped casing and that will support the casing in shape by itself, preferably when empty, but it might be permissible, in some instances, to employ a thinner walled bag and to fill the same with fluid under a low pressure. The container 7, adjacent its inner periphery, may be reinforced with fabric or with a metal plate or rim.

The next step in the process is to remove the casing and the supporting container therewithin, and to mount the same on rings of a shape suitable for the type of casing being manufactured. Such rings are indicated at 8 and 9 in Figures 10 and 19, respectively, of the drawings, being therein shown held against separation by clamps 10. It is to be understood, of course, that the fluid-pressure-container is equipped with an inflating valve or other suitable inflating means (not shown) and that the bead rings are suitably shaped to pass or accomodate the stem of such a valve or means.

Figure 10:
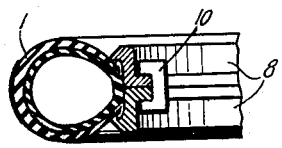
Figure 10 is a cross-section through the casing after it has been mounted on the bead rings.
Figure 11:
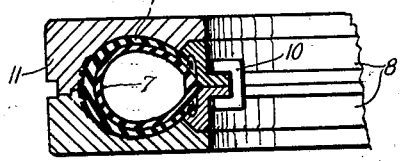
Figure 11 shows the same assembled in a vulcanizing mold.

If the production permits, the assemblage shown in Figures 10 and 19 is then introduced into a vulcanizing mold, such as those indicated at 11 and 12, in Figures 11 and 20, respectively, of the drawings, and the molds subjected to a suitable heat treatment, in a French press type of heater, for instance. During vulcanization, fluid under pressure, such as water, or air, or gas, the last-named preferably, is supplied to the interior of the container 7 so as to maintain a wall-compacting pressure on the inside of the casings while their outside is externally confined, as in the rigid molds 11 and 12 illustrated. But any convenient means may be employed to externally confine the casings.

If the production in the factory does not permit of enclosing the casings in the molds immediately after their mounting on bead rings, it is preferred to maintain a moderate pressure—say 25 pounds—on the inside of the fluid pressure container 7 to keep the casing in shape until it is about to be enclosed in a mold, when the pressure within the container 7 is relieved so as to facilitate the assemblage of the casing and bead rings in a mold by reducing the outside dimensions to a slight extent. Furthermore the casings would collapse a little more than is desirable for manufacturing purposes if the bags 7 were not inflated after shaping and before vulcanization when the time interval is protracted.

The container 7 may be charged with a definite quantity of fluid under pressure after the molds are clamped, as shown in Figure 20, for instance, and before they are stacked in a vulcanizer, or fluid pressure may be constantly supplied to or maintained on the interior of a number of the containers 7 in a stack of molds in a press by manifolding in a manner well-known to the trade and from an outside source of supply.

It will be noticed that the bead rings 8 and 9 are in immediate contact with the bead portions of the casing, whether it be a clincher or straight-side, during the vulcanizing operation and that these rings constitute parts of the mold although sections 11 and 12, as shown in Figures 11 and 12, do most of the external confining and shaping.

The foregoing relates largely to the process, what follows more particularly concerns the various apparatii that may be employed advantageously in practicing the process.

In Figure 4 is shown the simplest form of apparatus, consisting of a vacuum chamber having an outer wall 13 and top and bottom walls 14 and 15, respectively, the walls 13 and 14, may be and preferably but not necessarily, are integral. The wall 15 is made separate and removable and is adapted to be bolted, hinged or otherwise conveniently secured in position, with a strip or gasket 16 of rubber, for instance, closing the joint between the walls 13 and 15, hermetically or sufficiently to permit air being exhausted from the interior of the chamber through the pipe-line 17 connected to any suitable means for the purpose. A support 18 in the form of a flange, integrally or otherwise suitably connected to the bottom wall 14 of the chamber, is desirably provided so as to locate the pulley-band symmetrical with relation to the vacuum chamber. By "symmetrical" is meant positioned substantially concentric to the vacuum chamber and with its margins projecting substantially equally on opposite sides thereof. The inner surfaces of the walls 14 and 15 are preferably constructed, as disclosed in Figures 17 and 18 of the drawings, the details of which will appear later.

In Figures 6–9, inclusive, the preferred apparatus is illustrated. Therein, the vacuum chamber is shown comprising an outer wall 20, a bottom wall 21 integral therewith and a top wall 22, which is hinged, as indicated at 23, to the outer wall 20. A clamp, such as indicated at 24, is preferably provided for holding the top wall in position during the operation of the vacuum chamber, a gasket 25 being provided to air-tightly seal off the joint between the top wall or cover and the side of the vacuum chamber. To assist in raising the cover or top wall, an arm 26, which is pulled upon by a counter-balancing tension-spring 27, may be secured to the cover. The inner edges of the top and bottom walls are desirably rounded off as shown, or in any other convenient manner, so as not to injure the pulley-bands.

While the proportions and shape of the vacuum chamber may of course be varied, it is preferable to make the chamber slightly larger inside than the tread portion of the vulcanized casings which in consequence receive the bags 7 loosely without buckles or wrinkles; the diameter of the inside edges of the top and bottom walls is preferably greater than the normal bead diameter of the finished casing, which is being manufactured, and desirably enough greater to permit the pulley-band to be positioned easily and loosely, substantially as shown in several figures of the drawings. The width between the top and bottom walls of the vacuum chamber may be varied also, but it is preferred to have the free inner edges 28 sufficiently close together so as not to contact with the beads of the pulley-band until the latter has been substantially completely shaped by outwardly bulging its intermediate portion; but the edges 28 are spaced apart preferably far enough to allow the fluid pressure containers 7 to be introduced readily. The vacuum chamber may be generally described as U-shaped in cross-section, but it is to be understood that by this term it is not intended to confine the invention to a chamber having parallel top and bottom walls, as in Figure 12 for instance, inasmuch as the inner surfaces of the top and bottom walls may flare or converge as indicated in Figures 6, 7, 8 and 9 of the drawings. For exhausting air from the vacuum chamber, a pipe 29 is preferably provided to place it in communication with any suitable evacuating apparatus (not shown), the line 29 being controlled by a valve 30 (of a quick acting plug type well known in the arts) operable by a rod 31, having a handle 32. These parts are suitably mounted on a stand or frame 33, which supports, by standards 34, the vacuum chamber.

In the preferred apparatus, the pulley-band is initially distended by a tube 35, preferably of vulcanizable rubber composition and inflatable through a hose 36, which is in communication with what may be conveniently termed a multiple valve 37. The details of this multiple valve 37 will later be described. The tube 35 is preferably mounted on a drum 38, below a conical portion 39 thereof, which serves to center the pulley-band when it is initially positioned upon the flange or plate 40 that is desirably provided, as before mentioned in connection with Figure 4 of the drawings to support the pulley-bands symmetrical of the vacuum chamber. The cone-topped drum 38 may be shifted from the position shown in Figure 6 to the position shown in Figures 7 and 8, in any suitable manner, conveniently by mounting it or a piston-rod 41, whose piston is operatively mounted in a cylinder 42. Fluid under pressure may be supplied to this cylinder 42 to raise the drum, exhaust of the cylinder allowing the drum to drop by gravity. It will be noticed that in Figure 6, (and others) there is substantially no obstruction to the ready mounting of the pulley-band in position for shaping, the margins 28 of the vacuum chamber being open and accessible. And there is nothing whatever above the vacuum chamber interfering with an operative moving a pulley-band horizontally and dropping it axially into position with great rapidity.

The multiple valve 37, which is shown in greater detail in Figures 6ª and 6ᵇ, is provided with four plungers or stems, 43, 44, 45, and 46, each of which is surrounded by a spring 47 normally holding its head seated. Levers 48 and 49 are fulcrumed on lugs extending upwardly from the casing to the multiple valve 37, these levers being adapted to operate one or the other of the two pairs of valves 43—45 or 44—46, respectively. The lever 48 is linked, as at 50, to a foot lever 51, which is pivoted at 52 to a depending portion of the multiple valve. Both levers 48 and 49 are normally held in the position shown in Figure 6 by coil springs 48' and 49'. Lever 49 is adapted to be operated by a rod 53, which is hinged at 54 to the drum and which is provided with a notch 55 adapted to engage the free end 56 of the lever 49. The notch 55 engages the end 56 of the lever 49 when the drum in rising reaches the proper position, such as shown in Figure 6, relative to the vacuum chamber. The depending rod 53 is surrounded by a collar 57 on one end of a rod 58, whose opposite end is articulated, as at 59, to a crank 60 on the rod 31 which is turned in operating valve 30. The interior of the multiple valve 37 is in communication with any suitable source of fluid pressure supply 61 and with the before-mentioned conduit 36 leading to the inflatable tube 35, and with a conduit 62 which communicates with the bottom end of the cylinder 42.

When the foot lever 51 is depressed, the lever 48 is rocked so as to close the exhaust valve 43, which communicates with the cylinder 42, and to open the valve 45, which communicates with the cylinder 15. The drum 38 is thereby raised to the limit of the stroke of the rod 41, this being preferably of a length to halt the drum in the position shown in Figure 7 with the inflatable tube 35 in proper position for preliminarily bulging the pulley-band. As the drum 38 moves to its extreme upward position, the notch 55 in the rod 53 engages lever 49 and rocks it so as to close the exhaust valve 46 and to open the valve 44, thus allowing compressed air, or other suitable fluid under pressure, to enter the inflatable tube 35 and bulge the pulley-band as shown in Figure 7 of the drawings. The operator now turns the handle 32 so as to operate valve 30 and place the vacuum chamber in communication, through pipe 29, with an exhaust apparatus (not shown). The casing having been substantially sealed against the edges 28 and the inner and open side of the substantially fixed vacuum chamber closed, the exhaust of the chamber quickly—almost instantaneously—pulls or draws the casing to approximately tire form, as shown in Figure 8. Practically simultaneously with the turning of the handle 32 to reduce the pressure inside of the vacuum chamber, the supply of air to the inflatable tube 35 is cut off and the tube vented, this being effected by the crank 60 and connections shown in Figure 6°, which disengage the pendent-rod 53 from the lever 49 so as to allow the latter to be rocked to the position shown in Figure 6. The casing being now substantially shaped and held by the vacuum, the operator removes his foot from the lever 51 so as to exhaust the cylinder 42 and allow the drum 38 to drop by gravity from the position shown in Figure 8 to the position shown in Figure 9. Thereafter, the fluid pressure container 7 is introduced and the process carried on as before detailed.

In Figures 12, 13, and 14, a slightly modified form of apparatus is illustrated, this being more particularly suited for treating straight-side casings. The construction is very similar to that already described in detail in Figure 6 and it would be superfluous to repeat the description of the common features of construction. In this form, however, it will be noticed that the vacuum chamber 63 has its outer wall formed in two sections, 64 and 65, which are lapped as indicated at 66, the joint between them being adapted to be sealed air-tightly by a rubber gasket 67, which is carried by the section 65. At suitable number of points, say three or more, the lower section 65 has secured to it a plate 68, which is provided with an inclined slot 69. In this slot is received a lug or roller 70, which is carried by the upper section 64. It will be obvious that by turning the upper section 64, it may be shifted towards or away from the lower section 65 and thereby the lips 28' of the vacuum chamber separated or approached, as desired, to accommodate pulley-bands of slightly different widths. The supporting plate 42' is preferably adjustably secured by the bolt and slot connection 71 to an angular ring 72, which is riveted, or otherwise suitably fixed, to the bottom wall of the vacuum chamber. This affords adjustment for supporting pulley-bands of different widths on the plate 42' so as to extend equal distances beyond the top and bottom plates of the vacuum chamber.

In the form of apparatus illustrated in Figure 12, the inner edges 28' of the vacuum chamber are preferably well clear of a pulley-band that has been built at approximately the desired finished or final diameter of its beads. If the internal diameter of the top and bottom walls of the vacuum chamber, i. e., measured at the free edges 28', is approximately equal to the building diameter of the pulley-band, difficulty would be experienced in forming it out to approximate tire shape inasmuch as the margins of the pulley-band would tend to remain more or less flat as built and thereby grip, bind, or lock, on the lips 28' of the vacuum chamber. This undesirable construction and its consequences upon the pulley-band being shaped are illustrated in Figure 16 of the drawings and emphasizes the advantage in making the lips 28 or 28' of the vacuum chamber in diameter greater than the beads of the finished casing. If the casing is built flat at approximately its bead diameter, the lips 28 and 28' of the vacuum chamber are preferably clear of the pulley-band about as shown in the other figures of the drawing.

The inner surfaces of the top and bottom walls of the vacuum chamber in all forms of construction are preferably shaped or formed to maintain a vacuum, or rather partial vacuum, within the chamber to a zone in proximity to the lips 28 or 28' of the vacuum chamber. In Figures 17 and 18, the preferred construction is illustrated as applied to the form of vacuum chamber shown in Figure 12. An annular groove 73, which is preferably, but not necessarily, continuous, is therein shown provided on the inner surface of the vacuum chamber immediately adjacent the free inner edges or lips of the top and bottom walls. This annular groove may be maintained in communication with the evacuating means by providing a series of ducts 74, extending back toward the outer wall of the vacuum chamber. These ducts 74 may be in the form of grooves, as shown, or tubes (not shown) located either on the outside of the chamber or buried in the material of its walls. But any suitable means might be employed for maintaining the reduced pressure to the inside margins of the pulley-bands. The grooves and ducts 73 and 74, or their equivalents, are desirable so as to insure the sides of the casing and the bead portions thereof remaining wide apart, thereby permitting the introduction of a fluid pressure container with facility.

In Figure 21 of the drawings, another inflating tube is indicated at 75, this being in the form shown in cross-section with one of its side walls clamped between a pair of plates 76 and 77, which are suitably secured to a plunger 78, the other of its side walls being sustained on one side by a plate 79 and collar 80 loose on a reduced end of the rod 78. In this form of construction, when the rod 78 is moved downwardly, the air or other fluid within the bag 75 is compressed so as to distend it and move the pulley-band into contact with the vacuum chamber 5, the lower wall of the bag 75 contacting with a round table 81, whose marginal portions are preferably shaped conical, as indicated at 82, for centering purposes, as heretofore mentioned.

Instead of initially distending the pulley-band into contact with the vacuum chamber 5, by means of an inflating tube, air in direct contact with the inside of the pulley-band may be utilized as illustrated in Figures 22 and 23. In these two figures of the drawings, the vacuum chamber 5 is shown supported and connected to a table 81 of substantially the same construction as that disclosed in Figure 21. Co-operating with the table 81 and the pulley-band 2, however, is a platen 83, carrying a cylindrical projection 84, which is adapted to fit within the pulley-band 2 as shown. In both cases, it prevents any inward buckling or movement of the pulley-band. The apparatus shown in these two figures, 22 and 23, is substantially identical, but in the former case, air under suitable pressure may be supplied to the inside of the pulley-band 2 through the valve-controlled pipe 85, while in the latter, the air trapped within the pulley-band and between the platen 83 and the round table 81 is adapted to be compressed and thereby effect bulging or distension of the pulley-band into contact with the vacuum chamber.

The initial distension or bulging of the pulley-band may be accomplished mechanically. One mechanical device is illustrated in Figure 24 as comprising a plurality of shoes 86, of which there may be any suitable number (only two being shown in the drawings for the sake of clearness). The shoes 86 are adapted to be actuated by a species of toggle 87, suitably articulated to a rod 88 which enters a hole 89 in the frame 90. Descent of the rod 88 causes the shoes to be thrust against the pulley-band. The pulley-band may be protected from cutting or abrasion by an interposed elastic strip or belt 91. The top of the frame 90 is preferably shaped conical, as at 92, in order to center the pulley-band relative the vacuum chamber 5.

A second mechanical form of initial distending apparatus is illustrative in Figure 25, wherein shoes 93 are shown hinged as at 94 to bell-cranks 95, which are fulcrumed at 96. Intermediately at 97, the bell-cranks 95 are pinned to links 98 which are connected to a piston-rod 99, operated from a cylinder 100, which may be actuated by fluid in any well-known manner so as to move the shoes 93, of which there may be any suitable number, from the position shown in dotted lines to and past the position shown in solid lines and thereby bulge the pulley-band out into contact with the vacuum chamber 5. In this form of the apparatus, the frame 101 carries a table 102, whose margins 103 are preferably shaped conical for centering purposes, as before mentioned.

In Figure 26 of the drawings is illustrated still another apparatus for effecting the initial distension of the pulley-band into contact with the vacuum chamber 5 mechanically rather than pneumatically. The vacuum chamber 5, table 81' and platen 83' are very similar to those shown in Figures 22 and 23 of the drawings, the only difference being that the table 81' is perforated, as at 104, so as to prevent air trapped between the platen and table from being compressed. In this form of apparatus, descent of the platen 83' compels the pulley-band 2 to collapse, but the projection 84' compels this collapse to take place outwardly and in consequence the pulley-band is folded annularly and progressively from its margins toward its center which latter is carried outwardly or distended. This continues until contact is made with the lips of the vacuum chamber, whose exhaust pulls the casing to approximately tire form. In this form of the apparatus, the piston-rod 78', which carries the upper platen, is shown operatively supported from a cylinder 105, whose opposite ends are adapted to be supplied with fluid under pressure from an outside source through a valve-controlled pipe 106 and branches, the valve 107 being conveniently operated by a handle 108 suitably connected with said valve.

In the foregoing, the process and the apparatus have been set forth sufficiently for one skilled in the art to practice the inventions which are capable of wide variation without departure from their underlying principles. In that form of the invention in which a press of the type illustrated in Figures 22 and 23 is provided, the shaping of the pulley-band may be done substantially completely with air above atmospheric pressure in direct contact with its interior, the vacuum chamber being utilized merely to hold the casing in shape until a fluid pressure container can be introduced to sustain the casing internally in tire shape preliminary to mounting the casing in molding members and vulcanizing. The invention is believed to be broad in scope and the various embodiments thereof that may be devised without departure from its underlying principles are intended to be comprehended in the accompanying claims to which reference should be made for a full understanding of its scope.

Having thus described my invention, what I claim and desire to protect by Letters Patent is:—

1. That method of manufacturing tire casings for motor vehicles which consists in, building a laminated pulley-band of strain-resisting-elements and rubber composition, shaping the band to approximately tire form, externally holding the band in approximately tire form with its inner periphery unobstructed, introducing a fluid pressure container into the casing to sustain it shaped, enclosing the casing in external molding members, and finally vulcanizing the casing with fluid under pressure within the container.

2. That method of manufacturing tire casings for motor vehicles which consists in, building a pulley-band of strain-resisting-elements and rubber composition, locating the band in operative relation to a suction device, shaping the band to approximately tire form and vacuously holding it in such shape with the space between its margins accessible for the introduction of an expansible container, introducing an expansible container within the casing and therewith holding it approximately in shape, and finally vulcanizing the casing with its exterior confined and its interior subjected to a wall-compacting pressure exerted by fluid under pressure within the expansible container.

3. That method of manufacturing tire casings for motor vehicles which consists in, building a laminated pulley-band of strain-resisting-elements and rubber composition, shaping the band to approximately tire form, holding the band in approximately tire form so as to at least snugly receive a fluid pressure container in its normal shape, introducing a form-retentive fluid pressure container into the shaped casing, mounting the margins of the casing on bead rings, positioning the so-mounted casing within a mold, and finally vulcanizing the casing with its interior subjected to a wall-compacting pressure.

4. That method of manufacturing tire casings for motor vehicles which consists in, building a laminated pulley-band of strain-resisting-elements and rubber composition, shaping the band to approximately tire form, holding the band in approximately tire form with its inner periphery unobstructed, introducing a form-retentive fluid pressure container into the shaped casing, enclosing the margins of the casing in bead rings, applying fluid under moderate pressure to the container for a convenient interval of time previous to assemblage in a mold, assembling the casing and rings in a mold, and finally vulcanizing the casing with fluid under a wall-compacting pressure within the container.

5. That method of manufacturing tire casings for motor vehicles which consists in, building a pulley-band of strain-resisting-elements and rubber composition, distending the band into contact with a suction device, shaping the band approximately to tire form and vacuously holding it in such shape with its margins accessible for the introduction of a member therebetween, introducing an expansible annular container and support within the shaped casing, enclosing the casing in external molding-members, and finally vulcanizing the casing with fluid under pressure within the expansible container.

6. That method of manufacturing tire casings for motor vehicles which consists in, building a pulley-band of strain-resisting-elements and rubber composition, locating the band in contact with a suction device, vacuously shaping the band to tire form and so holding it for the introduction of an expansible container within the casing, folding and introducing an expansible container within the casing to maintain the same in shape, enclosing the casing in external molding-members, and finally vulcanizing the casing.

7. The process of manufacturing pneumatic tire casings for motor vehicles which consists in, building the casing substantially flat of vulcanizable material, shaping the casing to tire form with its inner cavity accessible for the introduction of an annular member, introducing an expansible fluid-pressure container of a construction capable of retaining the casing approximately in its tire-shape without the introduction of fluid pressure, and subsequently vulcanizing the casing with the container filled with fluid under pressure to exert a wall-compacting action on the casing during its cure and while confined externally.

8. The process of manufacturing pneumatic tire casings for motor vehicles which consists in, building a pulley-band of strain-resisting-elements and rubber composition, pneumatically distending the band into contact with a suction device, shaping the band approximately to tire form and vacuously holding it in such shape with its margins accessible for the introduction of a member therebetween, introducing an expansible annular container and support within the shape casing, enclosing the casing in external molding-members, and finally vulcanizing the casing with fluid under pressure within the expansible container.

9. An apparatus for manufacturing tire casings comprising in combination, means for vacuously shaping a pulley-band to tire form, and means for initially bulging the pulley-band to a position operative upon by the first-mentioned means.

10. An apparatus for manufacturing tire casings comprising in combination, a hollow chamber open on its inner periphery, means for creating a vacuum within the chamber, and means for initially bulging the pulley-band to a position in contact operatively with said first-mentioned means.

11. An apparatus for manufacturing tire casings comprising in combination, a non-collapsible hollow annular chamber open to the atmosphere only on its inner periphery, said chamber having top and bottom walls, the inner margins of said walls being adapted to be engaged by a pulley-band between and away from the bead portions thereof, and means for exhausting air from said chamber while shaping a casing therein.

12. An apparatus for manufacturing tire casings having a hollow annular chamber substantially U-shaped in cross-section and open on its inner periphery, means for exhausting said chamber, in combination with means for initially distending a pulley-band into a position substantially closing the open side of said annular chamber.

13. An apparatus for manufacturing tire casings having a hollow annular chamber substantially U-shaped in cross-section and open on its inner periphery, means for exhausting said chamber, in combination with means including an inflatable tube for initially distending a pulley-band into a position substantially closing the open side of said annular chamber.

14. An apparatus for manufacturing tire casings having a hollow annular chamber substantially U-shaped in cross-section and open on its inner periphery, means for exhausting said chamber, in combination with means for initially distending a pulley-band into a position substantially closing the open side of said annular chamber, said last-named means including an inflatable tube and a support for said tube movable from an operative to an inoperative position with respect to said chamber.

15. An apparatus for manufacturing tire casings having a hollow annular chamber substantially U-shaped in cross-section and open on its inner periphery, means for exhausting said chamber, in combination with means for initially distending a pulley-band into a position substantially closing the open side of said annular chamber, said last-named means including an inflatable tube, a drum for supporting said tube, and means for shifting said drum axially to and from co-operative working relation with said annular chamber.

16. An apparatus for manufacturing tire casings having a hollow annular chamber substantially U-shaped in cross-section and open on its inner periphery, means for exhausting said chamber, in combination with means for initially distending a pulley-band into a position substantially closing the open side of said annular chamber, said last-named means including an inflatable tube, a drum for supporting said tube, and means for shifting said drum axially to and from co-operative working relation with said annular chamber, said drum carrying means for centering a pulley-band casing relative to the annular chamber 17. An apparatus for manufacturing tire casings having a hollow annular chamber substantially U-shaped in cross-section and open on its inner periphery, means for exhausting said chamber, in combination with means for initially distending a pulley-band into a position substantially closing the open side of said annular chamber, said last-named means including an inflatable tube, a support for said inflatable tube movable to and from operative relation with said annular chamber, means for inflating said tube, and means for deflating said tube operable simultaneously with the means for evacuating the chamber.

18. An apparatus for manufacturing tire casings comprising in combination, a non-collapsible hollow annular chamber substantially U-shaped in cross-section and open to the atmosphere only on its inner periphery, said chamber having top and bottom walls the inner margins of which are of a diameter greater than the bead diameter of the casing being manufactured, and means for exhausting said chamber.

19. An apparatus for manufacturing tire casings comprising in combination, a hollow annular chamber substantially U-shaped in cross-section and open to the atmosphere only on its inner periphery and of an internal diameter greater than the bead diameter of the casing being manufactured, said chamber having top and bottom walls spaced apart a fixed distance and materially less than the width of a band form of casing adapted to be shaped therein to approximately tire form, and means for exhausting said chamber.

20. An apparatus for manufacturing tire casings comprising a hollow annular chamber substantially U-shaped in cross-section and open to the atmosphere only on its inner periphery, means for exhausting the chamber, said chamber having top and bottom walls and an outside wall, each of the top and bottom plates being provided with an annular groove adjacent its free inner edge, and means for maintaining the groove in communication with the exhaust means.

21. An apparatus for manufacturing tire casings having a hollow annular chamber open on its inner periphery, means for exhausting said chamber, in combination with pneumatic means for initially distending a pulley-band into a position substantially closing the open side of said annular chamber.

22. An apparatus for manufacturing tire casings comprising a non-collapsible hollow annular chamber U-shaped in cross-section and open to the atmosphere only on its inner periphery, said chamber having an outer side wall, top and bottom walls positively secured to said outer wall, said top wall being hinged to the outer wall for facilitating removal of an article after it has been shaped in the chamber, and means for exhausting said chamber.

23. An apparatus for manufacturing tire casings comprising a non-collapsible hollow annular chamber of predetermined U-shape cross-section and open to the atmosphere only on its inner periphery, the space above the chamber being unobstructed to permit a pulley-band to be positioned for shaping in said chamber, and means for exhausting said chamber.

24. An apparatus for manufacturing tire casings comprising an annular hollow chamber having top and bottom walls and a rigid outer wall, the chamber being U-shaped in cross-section and open to the atmosphere only on its inner periphery, and means for exhausting air from the chamber to a zone in proximity to the inner periphery of the top and bottom walls whereby to maintain apart the edges of a tire being shaped.

25. An apparatus for manufacturing tire casings comprising an annular chamber with top and bottom walls and an outer wall, the inner periphery of the chamber only being open to the atmosphere, said top and bottom plates being each provided with an annular groove adjacent their free edges and with ducts maintaining the grooves in communication with the rear of the chamber, and means for exhausting air from the chamber.

26. An apparatus for manufacturing tire casings comprising a non-collapsible hollow annular chamber U-shaped in cross-section and having top and bottom walls and an outer wall, said walls during shaping of a tire being immovable, means for evacuating the chamber so as to shape a pulley-band to approximate tire form, and means for locating the pulley-band in substantially symmetrical relation to the annular chamber preliminary to its vacuous shaping.

27. An apparatus for manufacturing tire casings having a hollow annular chamber substantially U-shaped in cross-section and open on its inner periphery, means for exhausting said chamber, in combination with means for initially distending a pulley-band into a position substantially closing the open side of said annular chamber, said last-named means being shiftable to a position not obstructing introduction of an annular member within a casing held in said chamber.

28. An apparatus for manufacturing tire casings having a hollow annular chamber substantially U-shaped in cross-section and open on its inner periphery, means for exhausting said chamber, in combination with means for initially distending a pulley-band into a position substantially closing the open side of said annular chamber, and means for supporting a pulley-band in a position suitable for shaping within said chamber.

29. An apparatus for manufacturing tire casings comprising a hollow annular chamber substantially U-shaped in cross-section and open to the atmosphere only on its inner periphery, in combination with means for evacuating said chamber including ducts for maintainng less than atmospheric pressure on the inside of the chamber and to a zone in proximity to its open inner periphery.

30. That method of manufacturing tire casings for motor vehicles which consists in, building a pulley-band of strain-resisting-elements and rubber composition, partially shaping the pulley-band with fluid above atmospheric pressure in direct contact with its interior, completely shaping the band to tire form by reducing the pressure on its outer surface below that of the atmosphere where the pressure of the latter is maintained on the inner surface of the casing, holding the casing so shaped in tire form, mounting the casing so shaped on an annular member to retain it shaped, and finally vulcanizing the casing with its exterior confined and its interior subjected to pressure from a fluid.

31. An apparatus for manufacturing tire casings comprising a non-collapsible hollow annular chamber U-shaped in cross-section and open to the atmosphere only on its inner periphery, said chamber having an outer side-, top-, and bottom-walls adapted to be air tightly secured together to form a chamber of substantially invariable volume, at least one of said walls being shiftable at will for facilitating the removal of a tire casing after it has been shaped, and means for withdrawing air from the annular U-shaped chamber.

32. That method of manufacturing tire casings for motor vehicles which consists in, building a pulley-band of strain-resisting-elements and rubber composition, shaping the pulley-band to approximate tire form, vacuously holding the casing in approximate tire form with its inner periphery unobstructed for the convenient introduction of a form-retentive fluid pressure container, introducing such a container and breaking the applied vacuum, and finally vulcanizing the casing on said container while externally confined and internally subjected to pressure on a fluid within the container.

Signed at Detroit, county of Wayne, and State of Michigan, this 3rd day of August, 1923.

ADRIAN O. ABBOTT, Jr.